(12) United States Patent
Mowatt

(10) Patent No.: US 6,318,493 B1
(45) Date of Patent: Nov. 20, 2001

(54) COLUMN MOUNTED FORWARD/REVERSE SHUTTLE CONTROL

(75) Inventor: Jeffrey W. Mowatt, Essex (GB)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/650,830

(22) Filed: Aug. 30, 2000

(30) Foreign Application Priority Data

Sep. 4, 1999 (GB) .................................................. 9920898

(51) Int. Cl.[7] .................................................. B60K 20/06
(52) U.S. Cl. ..................... 180/336; 74/473.15; 74/473.31
(58) Field of Search ................................... 180/336, 337; 74/473.1, 473.15, 473.31

(56) References Cited

U.S. PATENT DOCUMENTS 2,861,465 * 11/1958 Winkle et al. .
3,417,635 * 12/1968 Day et al. .
4,635,497 * 1/1987 Siewert et al. .
5,797,685 * 8/1998 Jurik et al. .

FOREIGN PATENT DOCUMENTS 61-24620 * 2/1986 (JP) .

* cited by examiner

Primary Examiner—Paul N. Dickson
(74) Attorney, Agent, or Firm—Larry W. Miller; John William Stader

(57) ABSTRACT

An agricultural tractor is provided with a steering column, a gearbox forming part of the vehicle drive train and having a selection lever and a gear change mechanism mounted on the steering column for remotely operating the selection lever of the gearbox. The gear change mechanism comprises a collar mounted for rotation about the axis of the steering column, a first bevel gear fast in rotation with the collar, a second bevel gear meshing with the first bevel gear and mounted for rotation about a fixed axis that extends generally radially from the steering column, a crank arm connected for rotation with the second bevel gear, and a flexible cable connecting the crank arm to the selection lever of the gearbox, the cable enabling the end of the selection lever to be pulled and pushed by rotation of the collar about the steering column.

16 Claims, 3 Drawing Sheets

COLUMN MOUNTED FORWARD/REVERSE SHUTTLE CONTROL

BACKGROUND OF THE INVENTION

The present invention relates to a vehicle having a control mechanism for effecting a gear change in a vehicle, and is particularly applicable to a mechanism for controlling a forward/reverse shuttle mechanism in an agricultural tractor.

Agricultural tractors commonly have a lever for selecting the direction of travel, which is different from the lever for selecting the gear ratio. Having such a separate forward/reverse shuttle lever is convenient during low speed steering maneuvers, such as turning around a tractor towing a plough. In some vehicles, the shuttle can be operated without separately needing to operate a clutch during the gear changes.

Currently more sophisticated agricultural vehicles with electronically controlled transmissions, have an electrical or electronic forward/reverse shuttle control lever mounted on the steering column. On the other hand, vehicles with mechanically controlled transmissions currently have a mechanical lever located either on the left or right side of the tractor, depending upon the model of the vehicle.

SUMMARY OF THE INVENTION

The present invention seeks to provide a vehicle having a control mechanism for a mechanical gear box, especially a forward/reverse shuttle, that can be mounted on the steering column, so that a common position for the control mechanism may be adopted for vehicles having mechanically and electronically controlled gear boxes.

According to the present invention, there is provided a vehicle having a steering column, a gearbox forming part of the vehicle drive train and having a selection lever and a gear change mechanism mounted on the steering column for remotely operating the selection lever of the gearbox, wherein the gear change mechanism comprises a collar mounted for rotation about the axis of the steering column, a bevel gear fast in rotation with the collar, a second bevel gear meshing with the first bevel gear and mounted for rotation about a fixed axis that extends generally radially from the steering column, a crank arm connected for rotation with the second bevel gear and a flexible cable connecting the crank arm to the selection lever of the gearbox, the cable enabling the end of the selection lever to be pulled and pushed by rotation of the collar about the steering column.

Preferably, the collar is rotatable by a control lever that extends generally radially from the steering column and is mounted on the collar for pivotal movement in a plane containing the axis of the steering column and the radially inner end of the control lever extends through the collar into a shaped stationary groove that constrains the angular displacement of the collar about the axis of the steering column and the angular displacement of the control lever relative to the collar.

As earlier mentioned, the invention is especially intended for the forward/reverse shuttle of an agricultural vehicle. Such a gearbox has a selection lever with three positions corresponding to forward, neutral and reverse. In such a case, it desirable not to be able to overshoot the central neutral position and thereby switch directly between forward and reverse accidentally.

In one embodiment of the invention, the stationary groove may be Z shaped so that a gate is defined in the neutral position that has to be crossed by moving the end of the control lever parallel to the steering column before it can be used to rotate the collar about the steering column from the forward position to the reverse position.

In an alternative embodiment of the invention, the stationary groove may be T shaped and the control lever may be spring biased in its central position towards a locked position in which it cannot rotate the collar, so that neither forward nor reverse may be selected.

The groove needs to be stationary in relation to the steering column and to this end it may either be formed in the steering column or it may be formed in a ring surrounding the steering column that is itself suitably anchored to the body of the motor vehicle.

It is not necessary for the first and second bevel gears to be full gears as they are only rotated through a small angle and it would suffice for them to be toothed sectors or quadrants.

These and other objects, features and advantages are accomplished according to the instant invention in which an agricultural tractor is provided with a steering column, a gearbox forming part of the vehicle drive train and having a selection lever and a gear change mechanism mounted on the steering column for remotely operating the selection lever of the gearbox. The gear change mechanism comprises a collar mounted for rotation about the axis of the steering column, a first bevel gear fast in rotation with the collar, a second bevel gear meshing with the first bevel gear and mounted for rotation about a fixed axis that extends generally radially from the steering column, a rank arm 44 connected for rotation with the second bevel gear, and a flexible cable connecting the crank arm to the selection lever of the gearbox, the cable enabling the end of the selection lever to be pulled and pushed by rotation of the collar about the steering column.

BRIEF DESCRIPTION OF THE DRAWINGS

The invention will now be described further, by way of example, with reference to the accompanying drawings, wherein.

DETAILED DESCRIPTION OF THE PREFERRED EMBODIMENT

Figure 1:
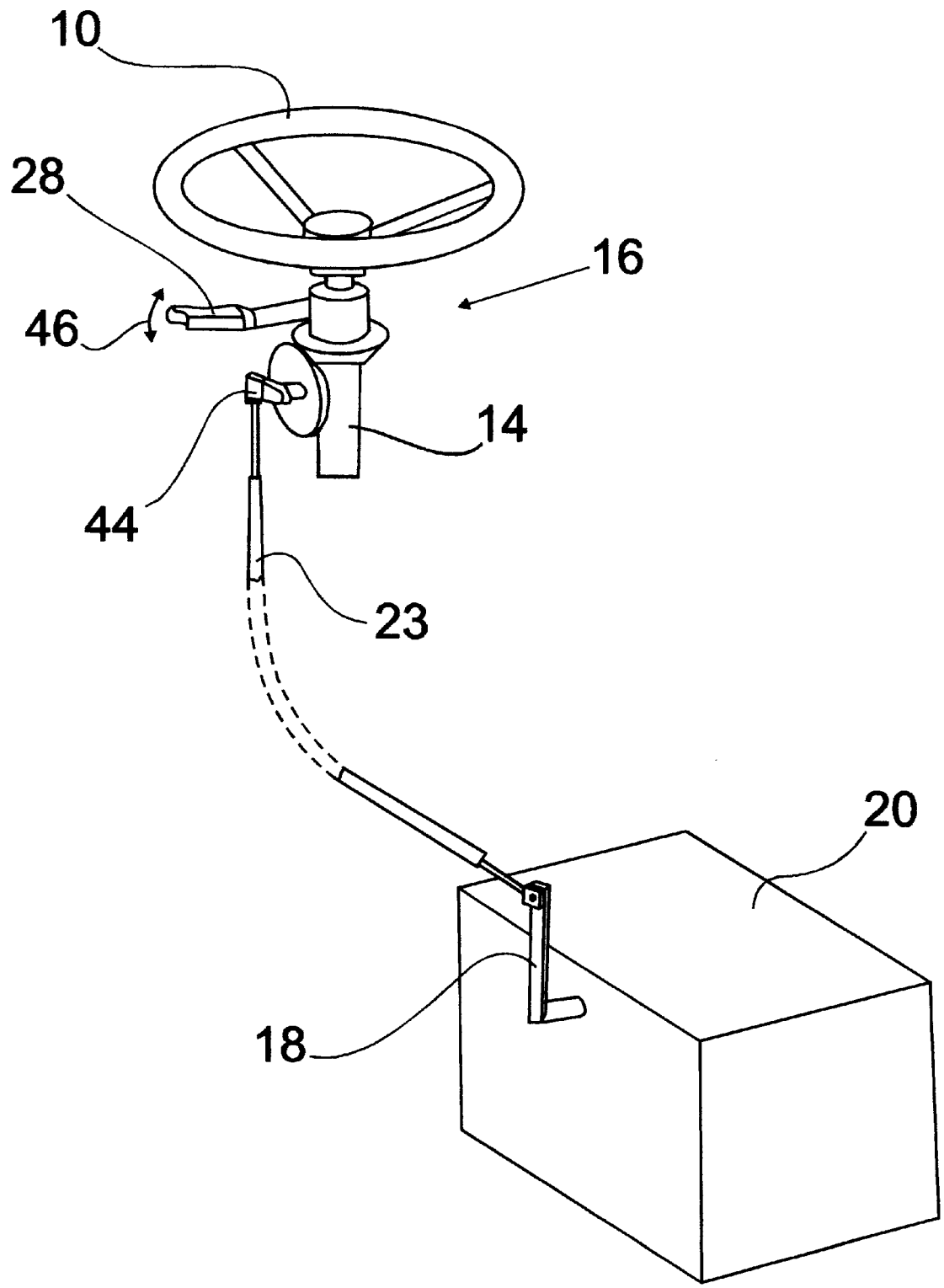
FIG. 1 is a schematic representation of a control mechanism mounted on a steering column and connected to the selection lever of a remotely located gear box by means of a cable.

FIG. 1 shows a steering wheel 10 of an agricultural vehicle, mounted on a steering shaft that is rotatably supported within a steering column 14. As is clearer from the section of FIG. 3, the steering shaft 12 is rotatably supported in the stationary steering column 14 by journal bearings 26. The vehicle also has a shuttle gear box 20 that is remotely operated by a control mechanism, generally designated 16. The control mechanism 16 is mounted on the steering column 14 and acts on a selection lever 18 of the gear box 20 by way of a push and pull Bowden cable 23 that comprises an inner cable and a stationary outer sheath.

Figure 2:
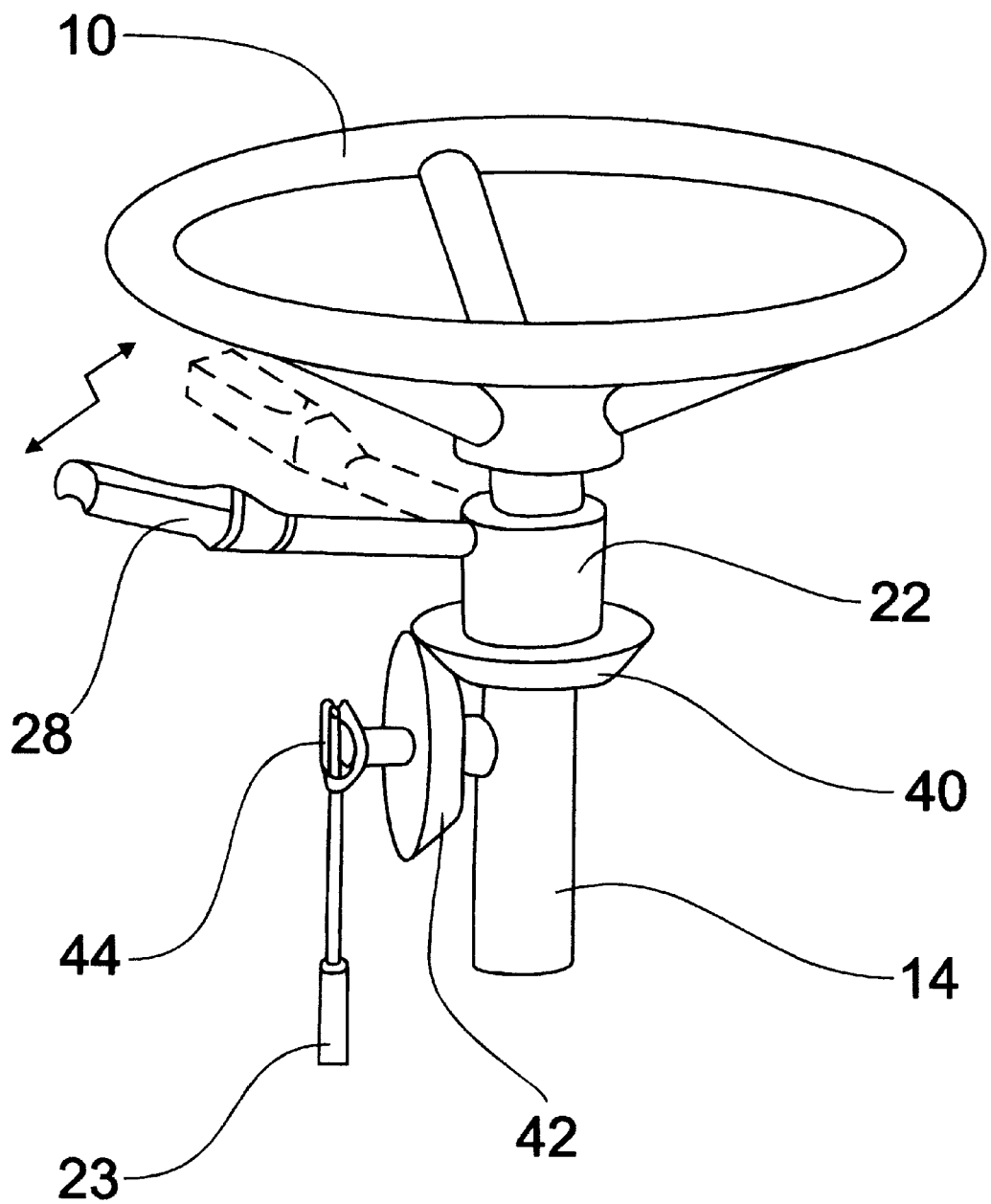
FIG. 2 is a schematic perspective view showing the steering column mounted control mechanism to an enlarged scale and showing the control lever in two different positions.
Figure 3:
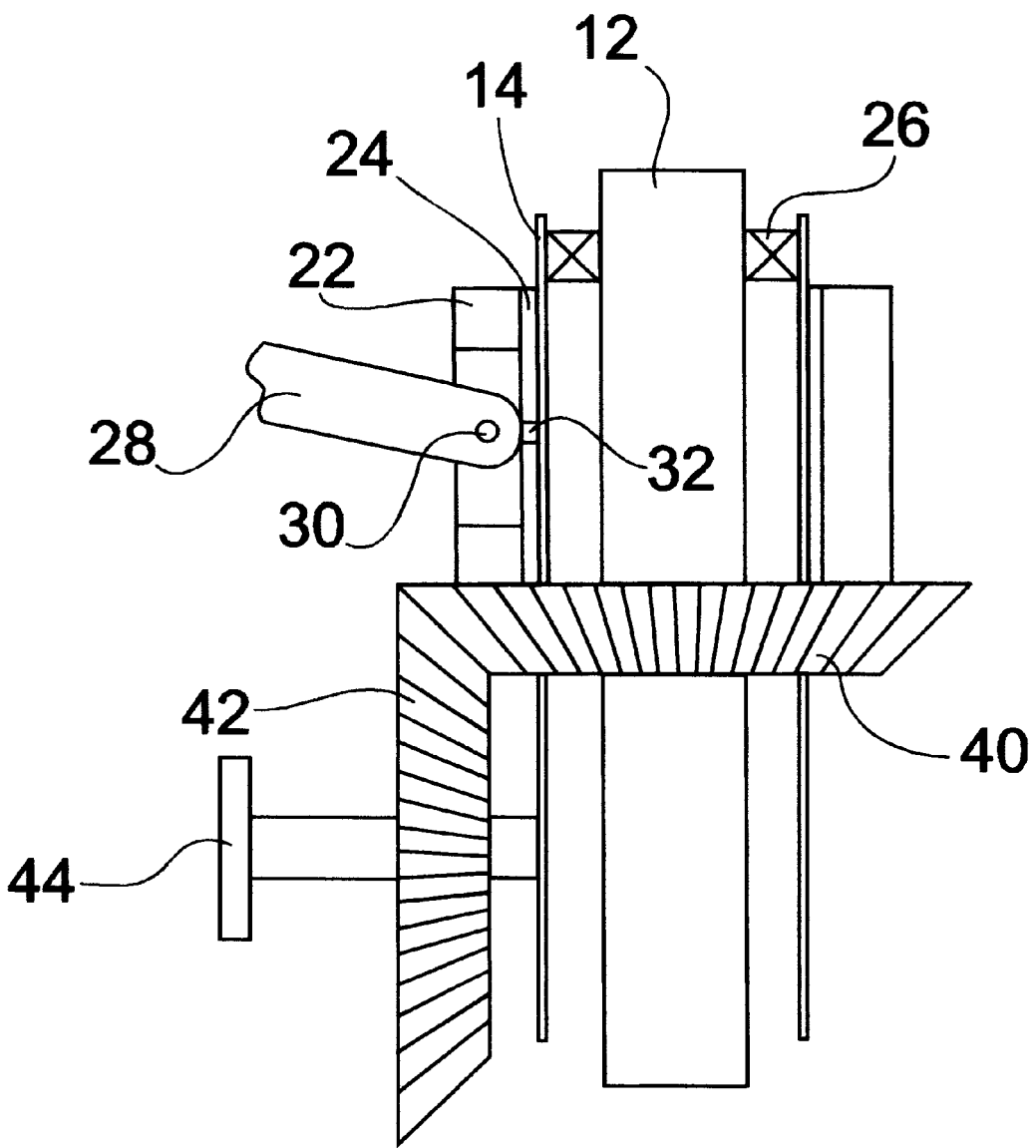
FIG. 3 is a schematic section through the steering control mounted control mechanism.

The control mechanism 16, which is shown in more detail in FIGS. 2 and 3, comprises a collar 22 mounted for rotation around a sleeve 24 that is secured to the steering column 14. A control lever 28 is pivotally mounted by means of a pin 30 on the collar 22. The inner end of the lever 28 has a projection 32 that fits in a slot in the sleeve 24.

The collar 22 is fast in rotation with a first bevel gear 40 that meshes with a second bevel gear 42. The second bevel gear 42 can rotate about an axis that is fixed in relation to the steering column 14 and is fast in rotation with a crank arm 44. The free end of the crank arm is connected to one end of the inner cable of the Bowden cable 23, the other end of the inner cable being connected in a similar manner to the selection lever 18 of the shuttle gear box 20.

In operation, the collar 22 is manually rotated about the axis of the steering column by means of the control lever 28. Rotation of the collar 22 causes the meshing bevel gears 40 and 42 to turn and this results in the crank arm 44 pulling and pushing the end of the inner cable of the Bowden cable 23. The movement of the inner cable relative to he outer sheath results in the selection lever 18 being pulled and pushed to select the appropriate drive gear.

In addition to being rotatable about the axis of the steering column 14, the control lever 28 can also be pivoted about the pin 30 relative to the collar 22 in the direction represented by the double arrow 46 in FIG. 1. The purpose of this movement as will now be explained is to provide a central neutral position in which neither forward nor reverse gear is engaged.

The groove in the sleeve 24 can be Z shaped, that it to say it may comprise two circumferentially offset tangential runs connected to one another by a central axially extending run. The central run defines a neutral gate. The engagement of the projection 32 of the lever 28 in this groove constrains the movements of the lever 28 and the collar 22. If the free end of the control lever 28 is pulled towards the steering wheel 10 while the collar 22 is in a neutral position, then it can be turned in only one direction about the axis of the steering wheel, to select for example forward gear. To select reverse, the control lever 28 must first be turned in the opposite direction and this movement ceases when the control 28 lever reaches the neutral gate.

At this point, the free end of the control lever 28 must be moved away from the steering wheel 10 to traverse the neutral gate before it can be rotated further about the steering column axis to rotate the collar 22 into the reverse position. In this way, it is possible to ensure that the control lever 28 cannot accidentally engage a drive gear while it is being returned into the neutral position. If desired, a spring may be provided between the collar 22 and the control lever 28 to bias the control lever into a central position so that it must intentionally be pulled towards or pushed away from the steering wheel 10 before a drive gear can be selected.

It is not essential for the groove in the sleeve 24 to be Z shaped and it may for example be T shaped. In this case, the upright of the T will correspond to neutral and a spring may be used to urge the control lever 28 so that its projection 32 is automatically biased towards the base of the upright of the T shaped groove. To engage a gear, the control lever 28 must be urged in the opposite direction to the spring bias before it can be turned in either direction about the axis of the steering column to select the appropriate drive gear.

It will be clear that the bevel gears 40, 42 will not be required to turn through a full revolution and for this reason, they need not be full gears but may be formed as toothed sectors or quadrants.

It is possible to prevent accidental operation of the control lever 28 by adding an interlock between the clutch and the shuttle control. If such an interlock is added, the clutch would need to be operated before forward or reverse could be selected. Such an interlock could for example take the form of a spring biased locking element acting on any of the components that rotate with the collar 22 and retracted from its locking position, against its spring bias, by means of cable that is connected to the clutch operating lever or pedal.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a vehicle having a steering column defining a generally upright axis; a vehicle drive train including a gearbox having a selection lever; and a gear change mechanism mounted on the steering column for remotely operating the selection lever of the gearbox, the improvement comprising:

said gear change mechanism including:
 a collar mounted for rotation about the axis of the steering column;
 a first bevel gear fast in rotation with the collar;
 a second bevel gear meshing with the first bevel gear and mounted for rotation about a fixed axis extending generally radially from the steering column;
 a crank arm connected for rotation with the second bevel gear; and
 a flexible cable connecting the crank arm to the selection lever of the gearbox, the cable enabling an end of the selection lever to be pulled and pushed by rotation of the collar about the steering column.

2. The vehicle of claim 1 wherein the collar is rotatable by a control lever that extends generally radially from the steering column and is mounted on the collar for pivotal movement in a plane containing the axis of the steering column and wherein a radially inner end of the control lever extends through the collar into a shaped stationary groove that constrains angular displacement of the collar about the axis of the steering column and angular displacement of the control lever relative to the collar.

3. The vehicle of claim 2 wherein the vehicle is an agricultural tractor and the gear box is a forward/reverse shuttle movable between a forward position and a reverse position.

4. The vehicle of claim 3 wherein the stationary groove is Z shaped and defines a gate in the neutral position that has to be crossed by moving an end of the control lever parallel to the steering column before said control lever can rotate the collar about the steering column from the forward position to the reverse position.

5. The vehicle of claim 3 wherein the stationary groove is T shaped and the control lever is spring biased in a central position towards a locked position in which the collar cannot be rotated in either direction, such that neither forward nor reverse may be selected.

6. The vehicle of claim 3 wherein said vehicle further includes:
 a clutch movable between an engaged position and a disengaged position and having an operating lever associated therewith to effect movement thereof between said engaged and disengaged positions; and an interlock operably interconnecting the gear change mechanism and the clutch operating lever to permit rotation of the collar only when the clutch has been moved into said disengaged position.

7. A agricultural tractor comprising:

a frame supported above the ground by ground engaging wheels;

an engine supported on said frame to provide operative power for said tractor, said engine being operatively connected to a drive train including a transmission movable between a forward operating configuration and a reverse operating configuration, said transmission having a selection lever to effect the movement of said transmission between said forward and reverse operating configurations;

a steering column associated with said ground engaging wheels to control the orientation thereof to steer said tractor during motion thereof, said steering column defining a generally upright axis; and a gear change mechanism mounted on said steering column and being operatively connected to said transmission selection lever for remotely operating the selection lever of the gearbox, said gear change mechanism including:

a collar mounted for rotation about the axis of the steering column between a forward position corresponding to said forward operating configuration of said transmission and a reverse position corresponding to said reverse operating configuration of said transmission;

a first bevel gear fast in rotation with the collar;

a second bevel gear meshing with the first bevel gear and mounted for rotation about a fixed axis extending generally radially from the steering column;

a crank arm connected for rotation with the second bevel gear; and a flexible cable connecting the crank arm to the selection lever of the gearbox, the cable enabling an end of the selection lever to be pulled and pushed by rotation of the collar about the steering column.

8. The tractor of claim 7 wherein said collar is rotatable by a control lever that extends generally radially from said steering column and is mounted on said collar for pivotal movement in a plane containing said axis of said steering column; and wherein a radially inner end of said control lever extends through said collar into a shaped stationary groove that constrains angular displacement of said collar about said axis of the steering column and angular displacement of said control lever relative to said collar.

9. The tractor of claim 8 wherein said stationary groove is Z-shaped and defines a gate in a neutral position that has to be crossed by moving an end of said control lever parallel to said steering column before said control lever can rotate said collar about said steering column from said forward position to said reverse position.

10. The tractor of claim 8 wherein said stationary groove is T shaped and said control lever is spring biased while in a central position towards a locked position in which the collar cannot be rotated to either of said forward or reverse positions, such that neither of said forward or reverse operating configurations in said transmission can be selected.

11. The tractor of claim 8 further comprising:

a clutch movable between an engaged position and a disengaged position and having an operating lever associated therewith to effect movement thereof between said engaged and disengaged positions; and an interlock operably interconnecting the gear change mechanism and the clutch operating lever to permit rotation of the collar only when the clutch has been moved into said disengaged position.

12. A control mechanism for a forward/reverse shuttle mechanism on a tractor having an engine operatively connected to a drive train including a transmission movable between a forward operating configuration and a reverse operating configuration, said transmission having a selection lever to effect the movement of said transmission between said forward and reverse operating configurations; and a steering column defining a generally upright axis and including a control lever that extends generally radially from said steering column, comprising:

a collar mounted for rotation about the axis of the steering column between a forward position corresponding to said forward operating configuration of said transmission and a reverse position corresponding to said reverse operating configuration of said transmission, said control lever being mounted on said collar for pivotal movement in a plane containing said axis of said steering column;

a first bevel gear fast in rotation with the collar;

a second bevel gear meshing with the first bevel gear and mounted for rotation about a fixed axis extending generally radially from the steering column;

a crank arm connected for rotation with the second bevel gear; and a flexible cable connecting the crank arm to the selection lever of the gearbox, the cable enabling an end of the selection lever to be pulled and pushed by rotation of the collar about the steering column.

13. The control mechanism of claim 12 wherein a radially inner end of said control lever extends through said collar into a shaped stationary groove that constrains angular displacement of said collar about said axis of the steering column and angular displacement of said control lever relative to said collar.

14. The control mechanism of claim 13 wherein said stationary groove is Z-shaped and defines a gate in a neutral position that has to be crossed by moving an end of said control lever parallel to said steering column before said control lever can rotate said collar about said steering column from said forward position to said reverse position.

15. The control mechanism of claim 13 wherein said stationary groove is T shaped and said control lever is spring biased while in a central position towards a locked position in which the collar cannot be rotated to either of said forward or reverse positions, such that neither of said forward or reverse operating configurations in said transmission can be selected.

16. The control mechanism of claim 13 further comprising:

a clutch movable between an engaged position and a disengaged position and having an operating lever associated therewith to effect movement thereof between said engaged and disengaged positions; and an interlock operably interconnecting the gear change mechanism and the clutch operating lever to permit rotation of the collar only when the clutch has been moved into said disengaged position.

* * * * *